United States Patent [19]

Nicoloff et al.

[11] 4,221,230
[45] Sep. 9, 1980

[54] VARIABLE AIR INLET FOR A RAMJET POWERED MISSILE

[75] Inventors: George B. Nicoloff; Clark Kerr, Jr., both of San Diego, Calif.

[73] Assignee: General Dynamics Corporation, San Diego, Calif.

[21] Appl. No.: 968,347

[22] Filed: Dec. 11, 1978

[51] Int. Cl.² ............................................. F02K 1/00
[52] U.S. Cl. ................................ 137/15.1; 244/135 R
[58] Field of Search ........................... 137/15.1, 15.2; 60/270 R; 244/135 R

[56] References Cited

U.S. PATENT DOCUMENTS

| 2,686,473 | 8/1954 | Vogel | 60/244 |
| 2,766,581 | 10/1956 | Welsh | 60/261 |
| 3,098,632 | 7/1963 | Christenson | 244/135 |

*Primary Examiner*—Alan Cohan
*Attorney, Agent, or Firm*—Frank D. Gilliam; John R. Duncan

[57] ABSTRACT

A ramjet powered missile having means for controlling the air inlet geometry for best efficiency at a given end-of-boost-take-over Mach number and for changing the inlet geometry for best efficiency at a higher Mach number for fuel economy and extended flight range comprising a first jetisonable air inlet formed of a plurality of removable lip sections held in place by connecting struts and pyrotechnic thrusters. The explosive charge of the thrusters when activated eject the lip sections and struts outward and clear of the missile thus providing a second inlet of a different geometry.

7 Claims, 6 Drawing Figures

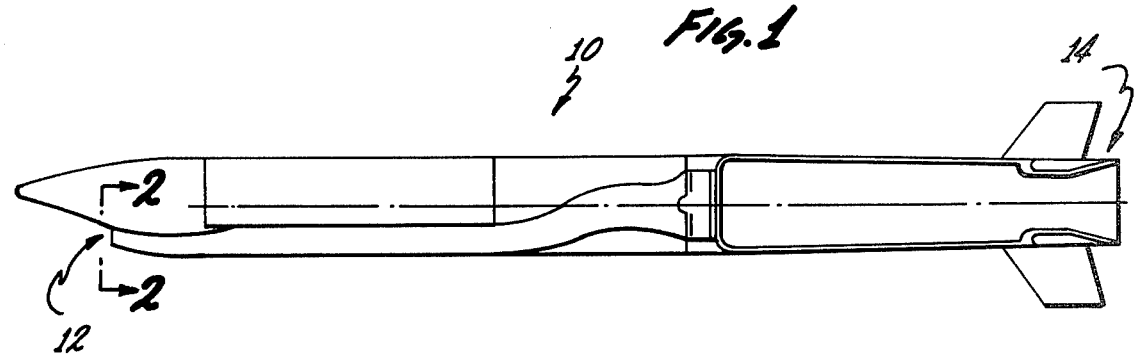
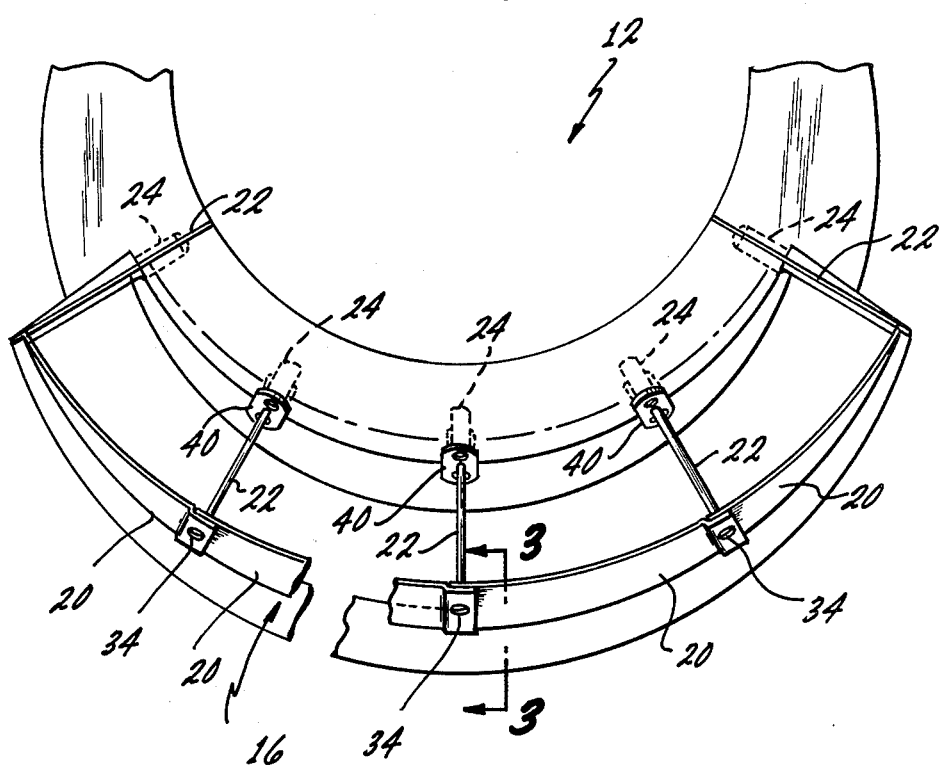
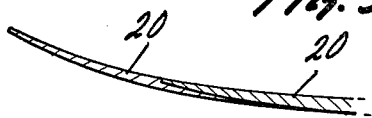

VARIABLE AIR INLET FOR A RAMJET POWERED MISSILE

BACKGROUND OF THE INVENTION

This invention relates to supersonic ramjet powered missiles and in particular to means for varying the air inlet thereof, in flight, for improved performance.

Conventionally, a ramjet air inlet is sized to match a given Mach number. Being of a fixed area, the inlet is inefficient at a higher Mach number. Thus, it is recognized that if the inlet area and inlet lip position could be varied to match both boost and cruising operating conditions, a total boost-climb fuel economy would result from earlier ramjet "take-over" and the range of the missile would be extended. This invention is directed to that end.

Stated another way, this invention increases the efficiency of a ramjet powered missile by providing an inlet capture area for best efficiency at a lower boost "take-over" Mach number and, after actuation, provides an inlet lip geometry for best efficiency at a higher Mach number.

Accordingly, it is a principal object of this invention to provide a means for varying an air inlet of a ramjet missile in flight for improved mission performance.

More specifically it is an object of this invention to provide a ramjet missile with an inlet area and lip position which are variable for best efficiency at different Mach numbers.

SUMMARY AND ADDITIONAL BACKGROUND OF THE INVENTION

The invention which accomplishes the foregoing objects comprises a first removable or jetisonable inlet area comprising a plurality of jetisonable lip sections defining the leading edge of the inlet which are retained on the ramjet body by struts which form part of pyrotechnic thrusters. These thrusters, when actuated, forceably eject the jetisonable lip sections out and away from the missile thereby providing a second inlet area for higher speed.

There are a number of prior art patents which show means for changing portions of a missile for variable operating conditions, typical examples of which are shown in the U.S. Patents to Welsh U.S. Pat. No. 2,766,581, to Christenson U.S. Pat. No. 3,098,632, and to Vogel U.S. Pat. No. 2,686,473, but none are directed to a means for controlling the inlet geometry of a ramjet missile particularly using explosive means to jetison the inlet geometry varying means in the manner of this invention.

BRIEF DESCRIPTION OF THE DRAWINGS

FIG. 1 is a side view partly in phantom to show a ramjet missile incorportating the present invention;

FIG. 2 is a frontal view, taken along line 2—2 of FIG. 1 and enlarged to show the details of the present invention;

FIG. 3 is a cross-sectional view taken generally along line 3—3 of FIG. 2 and looking into the direction of the arrows but also showing the end taper of the inlet lips;

BRIEF DESCRIPTION OF THE PREFERRED EMBODIMENT

Figure 4:
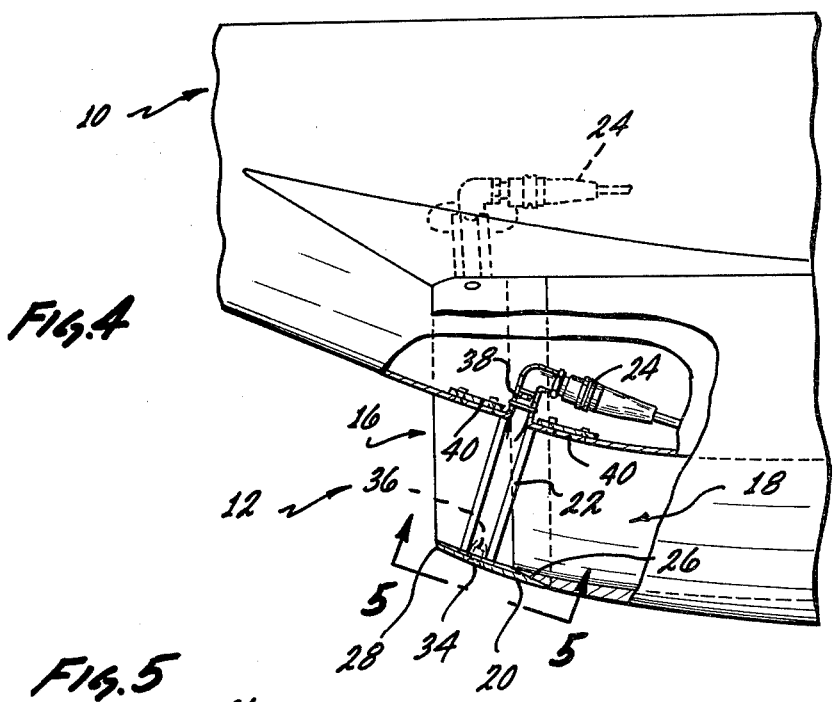
FIG. 4 is an enlarged side view of the inlet to the missile enlarged, partly in section and partly in phantom, to show the details of the invention.
Figure 5:
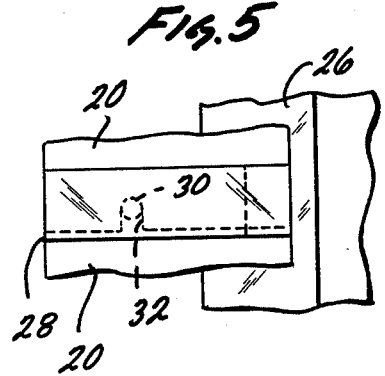
FIG. 5 is a partial planned view taken along line 5—5 of FIG. 4 and looking into the direction of the arrows to show the overlapping sections of the inlet lips.

Turning first to FIG. 1 there is shown a ramjet powered missile indicated in its entirely as 10 having an air inlet 12 and an exhaust nozzle 14.

In this missile 10, means are provided for controlling the air entering the inlet of the missile. In the embodiment shown, this controlling means is a first jetisonable inlet arrangement 16 of a given geometric configuration located fore a second or non-jetisonable air inlet 18 also of a given configuration to thus provide a two inlet variation for the missile. This is shown clearly in FIG. 6 where the first inlet 16 is shown only in phantom.

The first jetisonable air inlet 16 is sized for best efficiency at a given Mach number while the second inlet, which comes into operation after removal of the first inlet, is sized for a higher Mach number. The exact geometric configuration of the first and second inlets is within the skill of those in the art; this invention being directed to the basic concept of a variable inlet and the means for removing the first inlet at a given time.

The first jetisonable inlet 16 comprises a plurality of overlapping lip sections 20 held in place on the missile by a plurality of struts 22, which span the inlet area between by the lip sections and the body of the missile and are connected to, and form part of pyrotechnic thrusters 24. These lip sections 20, being relatively thin, are contoured to define the air inlet of the missile and are tapered gradually from the center or bottom of the inlet towards the outer or end lip sections. The end lip sections terminate in relatively narrow edge as shown in FIG. 3. A the same time, sections 20 are also contoured, in cross section to overlap the lip of the second air inlet 18 as at 26 and, in fact, form an extension of the lip of the second or inlet 18 and also to define a narrow leading edge 28 facing the direction of the missile travel. The cross sectional taper of the lip section is clearly shown in FIG. 4 and in phantom in FIG. 6.

As mentioned previously, the lip sections overlap one another and in order to maintain the lips together, yet provide a means for their release, the overlapping portions of contiguous lip sections are fastened to the struts 22 so that, at the appropriate time, the several lip sections comprising the inlet 16 will separate. This is accomplished by providing each lip section with an aperture 30 at one end and a complimentary slot 32 at the other end so that contiguous lip sections are held together at their overlapping joints by a pin or screw such as 34. This pin or screw 34 is inserted through the aperture 30 and into a bore 36 (threaded if a screw is used) in the end of the strut holding the lip sections together at their overlapping joints.

The other end of each strut 22 opposite the lip sections 20 is formed with a circular rod-like end 38 which extends into the pyrotechnic thruster 24. The pyrotechnic thruster 20 is located within the body of the missile and fixed thereto by any suitable means, a flange 40 riveted to the missile skin being shown, and is provided with an explosive charge connected to a suitable electric power source for actuation. Since the thruster is of conventional design no further description thereof is deemed necessary.

Figure 6:
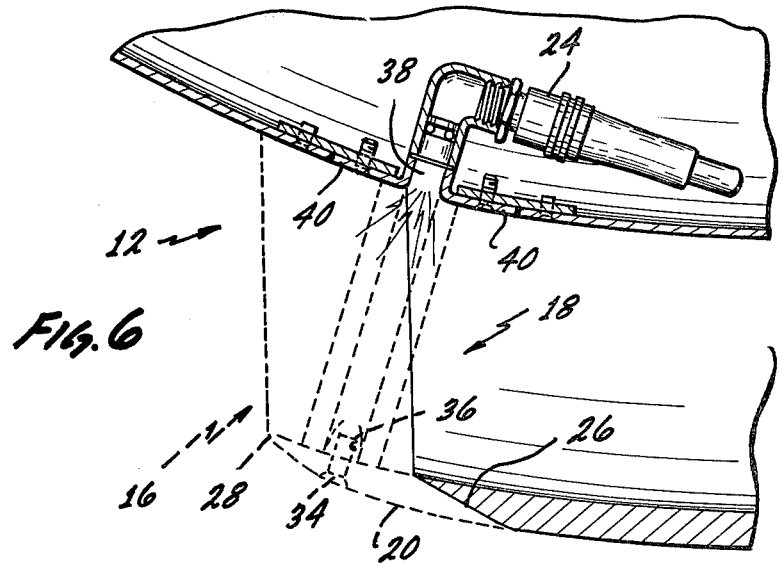
FIG. 6 is a side view, like FIG. 4, but showing the operation of the thruster and the removal of the inlet lip after the operation of the thruster.

Attention is now directed specifically to FIG. 6 where the first inlet 16 is shown in phantom with a graphic illustration of the explosive charge having been actuated. The expanding gases from the thruster are directed downwardly, i.e., in the direction of the center line of the struts to forceably eject the struts which, in turn, carry with them the lip sections which also separate from each other and from the struts. This downwardly directed force of the explosive thrusters forceably eject the lip sections and the struts out and away from the missile thus eliminating the danger of debri interfering with the in-flight operation of the vehicle.

Finally, while this invention is disclosed with only one jetisonable inlet section, it is within the scope of the invention to provide more than one inlet section for multiple in-flight variation of the air inlet, if desired.

What is claimed is:

1. A variable inlet for a ramjet missile comprising, means defining a non-jetisonable air inlet,
means defining at least one jetisonable air inlet disposed in front of said non-jetisonable air inlet,
said jetisonable air inlet including,
a plurality of relatively thin lip sections contoured to define an air inlet and forming an extension of said non-jetisonable air inlet, and
connecting means for releasably fastening said lip sections together and to the body of said missile and for forceably ejecting said lip sections at a selected time exposing said non-jetisonable inlet.

2. The variable inlet as claimed in claim 1 wherein said connecting means comprises strut means spanning the opening of said air inlet and means for fastening said lip sections to said strut means.

3. The variable inlet as claimed in claim 2 wherein contiguous lip sections partially overlap one another and wherein said overlapping portions contain aperture means and slot means, a fastening means said fastening means being inserted into said aperture means and slot means and into strut means.

4. The variable inlet as claimed in claim 3 wherein said connecting means includes means within said missile for containing a portion of said strut means for holding said strut means to said missile.

5. The variable inlet as claimed in claim 4 wherein said connecting means includes pyrotechnic thruster, said thrusters receiving a portion of said strut means and including an explosive charge which, when actuated, urges said strut means away from said missile.

6. The variable inlet as claimed in claim 4 wherein said connecting means comprises pyrotechnic thrusters, means in said thrusters for receiving a portion of said strut means, an explosive charge in said thruster, means for actuating said explosive charge to forceably disengage said strut means from said thrusters to force said strut means and said lip sections out and away from said non-jetisonable inet.

7. The variable inlet as claimed in claim 6 wherein a portion of said thrusters is arranged so that said explosive charge, whem activated, operates along the center line of said strut means and normal to the inlet area defined by said lip sections.

* * * * *